United States Patent [15] 3,649,193
Deyris [45] Mar. 14, 1972

[54] METHOD OF FORMING AND REGULARLY GROWING A SEMICONDUCTOR COMPOUND

[72] Inventor: Emile Deyris, Samson-Caen, France
[73] Assignee: U.S. Philips Corporation, New York, N.Y.
[22] Filed: Mar. 21, 1969
[21] Appl. No.: 809,300

[30] Foreign Application Priority Data

Mar. 22, 1968 France....................................145047

[52] U.S. Cl. ........................................23/204 R, 23/273 SP
[51] Int. Cl. .....................................C01b 27/00, B01d 9/00
[58] Field of Search........................23/204 R, 273, 294, 305; 148/1.6, 175

[56] References Cited

UNITED STATES PATENTS 3,305,313 2/1967 Sirgo et al...............................23/204
3,353,912 11/1967 Ainslie....................................23/204

*Primary Examiner*—Oscar R. Vertiz
*Assistant Examiner*—Hoke S. Miller
*Attorney*—Frank R. Trifari

[57] ABSTRACT

A method of producing a III–V semiconductor compound in which one of the elements is placed in a porous container within a reaction vessel and brought into a liquid state while the other element, also present in the reaction vessel, is volatilized and diffuses into the liquid element. The surface of the liquid element is covered with a layer of boron oxide to prevent contamination of the semiconductor compound by the material of the reaction vessel, e.g., silicon dioxide.

2 Claims, 2 Drawing Figures

Figure 1:
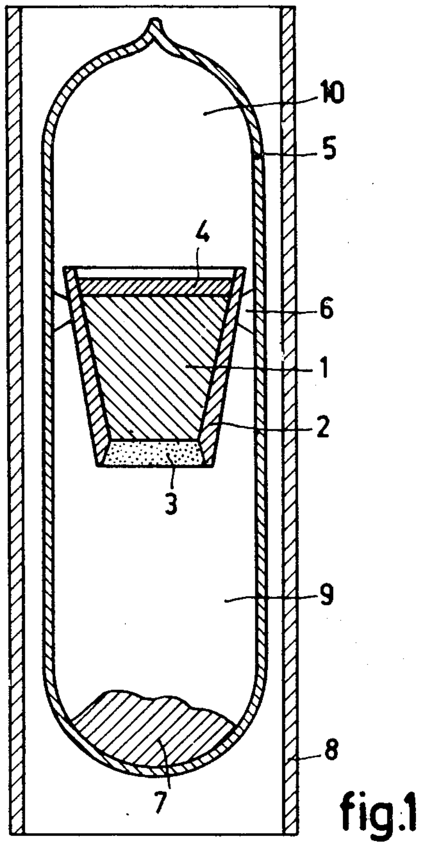

INVENTOR.
EMILE DEYRIS
BY
[signature]
AGENT

METHOD OF FORMING AND REGULARLY GROWING A SEMICONDUCTOR COMPOUND

The invention relates to a method of manufacturing a crystal of a semiconductor $A_{III}B_V$ compound by diffusing a volatile component in a liquid component in which crystallization occurs gradually by displacing a temperature gradient.

Semiconductor compounds constituted by elements of group III of the periodic system and of elements of group V of the periodic system are termed $A_{III}B_V$ compounds. They are used in numerous devices but for certain uses the crystal must be a very pure monocrystal. The most conventional methods of manufacturing such monocrystals comprise generally a first stage during which the compound is formed and a second stage during which a monocrystal is manufactured.

The formation is usually carried out in a quartz boat or crucible enclosed in an envelope which likewise consists of quartz and in which a component which is in the gaseous state and is pure or in the form of a compound is contacted with the other component which is in the liquid state.

This method may contaminate the compound, particularly by silicon. The silicon formed by the reduction of quartz is particularly liberated by the corrosion of the walls of the apparatus by one of the components, for example, gallium vapors.

The monocrystal is usually manufactured by vertical drawing from the surface of the formed compound in the liquid state, (czochralski method). In the case of $A_{III}B_V$ compounds, one of the components of which is volatile, and with a high reduction pressure at the melting temperature, it is necessary to maintain a sufficient pressure of the volatile component in the drawing device which involves complications in transmitting the drawing movement and danger of irregularities. This problem is partly solved by covering the liquid phase of the compound with a liquid layer of an inert material and ensuring an atmosphere of a neutral gas at the said required pressure. The inert material used in this method, which method is sometimes termed liquid encapsulation, is boron oxide, $B_2O_3$.

For certain $A_{III}B_V$ compounds, the Bridgman method may also be used in which the compound melted in a horizontal boat which is kept in a closed space under a sufficient pressure of the volatile component traverses a temperature gradient and crystallizes to form a monocrystal of the same shape as the boat. The danger of contamination by the silicon of the quartz of the boat and of the envelope is the same as during the formation of the compound and in order to avoid this danger it has been proposed when using the Bridgman method to fill the space with oxygen or to add to the melted compound and oxide of one of the components, for example, gallium oxide, $Ga_2O_3$, in case of gallium arsenide, or simply to bring in the space a small quantity of boron oxide according to the method described in patent application Ser. No. 809,133, filed concurrently herewith for: "method of forming semiconductor compounds."

However, the use of $A_{III}B_V$ compounds in high frequency devices, for example, devices with Gunn effect, require very pure monocrystals in which the mobility of the electrons is very large, and therefore the results of the above-mentioned known methods should be improved.

To that end it is desirable to obtain at the same time a protection such as is obtained by liquid boron oxide during the drawing operation and a chemical protection such as is obtained by oxygen during the formation or monocrystalline horizontal growth; it is of advantage to reduce or shorten the required number of thermal treatments, in order thus to restrict the possible contamination reactions and to reduce the manufacturing uncertainties and manufacturing costs.

It is the object of the invention to obtain in one single operation the formation and the crystal growth of a sufficiently pure $A_{III}B_V$ compound with optimum properties, destined particularly for manufacturing high frequency devices while maintaining the advantages of a crystal growth protected by an inert liquid layer.

The invention uses a method of manufacturing semiconductor crystals in which one of the constituents is dissolved in the second constituent in the liquid state, and diffuses in the said phase along a temperature gradient, the crystallization being effected by displacing the temperature gradient according as the formation of the compound progresses, or after the liquid component has been fully converted.

The invention uses the possibilities of protection and purification obtained by using boron oxide which does not contaminate the $A_{III}B_V$ compounds.

According to the invention, the method of manufacturing a crystal of a semiconductor $A_{III}B_V$ compound by diffusing a volatile component in a liquid component in which crystallization occurs gradually by displacing a temperature gradient, is characterized in that the surface of the liquid phase is covered with a layer of liquid boron oxide, the volatile component being diffused into the liquid component through a porous element.

It is to be noted that, according to a known method, gallium is introduced into an entirely porous vessel in a space in which phosphorus vapor is evolved. Through the porous walls, phosphorus is diffused on all sides into the gallium. The gallium solution is then cooled to cause the gallium phosphide to crystallize. In this method the molten gallium is not covered with liquid boron oxide, so that there is a greater possibility of contaminating the gallium and the gallium phosphide.

The method according to the invention enables the formation of the compound and the growth of the monocrystal in one single operation.

The boron oxide which covers the liquid phase, contributes to the purification of the compound. Actually it is known that this body has the property of the removing traces of oxide and the impurities from the surface of the liquid phase, without the danger of the latter being contaminated and without it being necessary for itself to be extremely pure. The effect of boron oxide is favored by the large contact surface with the liquid and then with the crystal.

In addition, the interface solid-liquid during crystallization is always insulated from the gaseous phase with the volatile component and it is known that this condition is necessary to obtain an optimum crystallization and a crystal without dislocations.

In a first preferred embodiment of the method according to the invention, the liquid phase is situated in a vertical crucible in which the volatile component is diffused through a porous bottom part, the boron oxide covering the whole surface of the liquid phase, and a heating device being provided which heats a closed space, in which the crucible and the volatile component are situated, in such manner that the volatile component is maintained at a pressure which is sufficient for the component to be diffused through the porous bottom part, the contents of the crucible being kept at a temperature which is higher than the melting temperature of the compound, a vertical temperature gradient being then displaced vertically with respect to the crucible so as to obtain a gradual crystallization of the formed compound.

In a second preferred embodiment of the method according to the invention, the liquid phase is situated in a horizontal boat and the boron oxide covers the whole surface of the liquid with the exception of a part of said surface which is covered by a porous plate through which the volatile component diffuses into the liquid phase, a heating device heating a closed space in which the boat and a quantity of the volatile component are situated so as to maintain said volatile component at a sufficiently high pressure for diffusion through the plate and maintaining the boat at a temperature which is higher than the melting temperature of the compound, a horizontal temperature gradient being then displaced in the longitudinal direction of the boat so as to obtain the gradual crystallization of the compound.

In a variation of the method according to the invention, a temperature gradient is displaced during the formation of the compound, the volatile component being dissolved in the liquid phase, the compound in the liquid phase migrating along the said gradient and crystallization being effected as said compound is formed.

In this latter variation, in which the method is used which is termed "growing in the melted condition", it may sometimes be of advantage to provide a crystallization nucleus or to give the end of the boat in which crystallization must start a conical shape, so as to favour the formation of a monocrystal.

Figure 2:
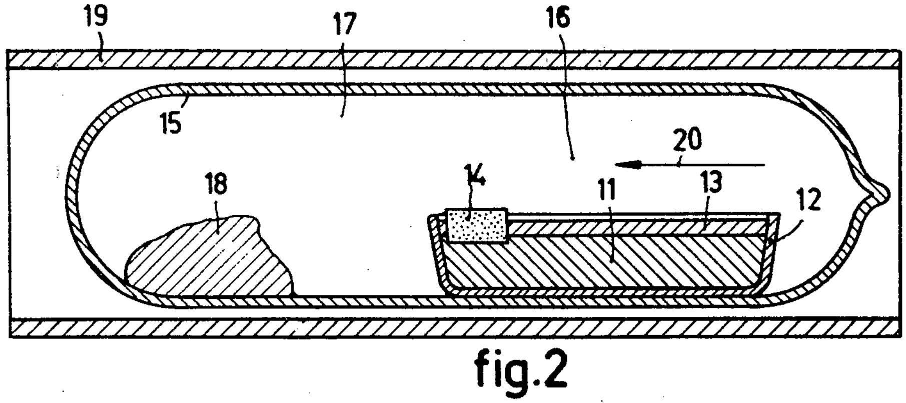

In order that the invention may be readily carried into effect, it will now be described in greater detail, by way of example, with reference to the accompanying drawings, in which FIG. 1 is a diagrammatic cross-sectional view of the device used in the first preferred embodiment of the method according to the invention, FIG. 2 is a diagrammatic cross-sectional view of the device used in the second preferred embodiment of the method according to the invention.

The following description relates to the formation and crystallization of a gallium arsenide crystal, but the invention is by no means restricted to the said semiconductor compound.

In the case of a vertical device as shown in FIG. 1, a quantity of gallium 1 is placed in a crucible 2 having a porous bottom. A quantity of boron oxide which is sufficient to form a thick layer 4 in the liquid state is placed above the gallium.

The crucible is placed in an airtight vertical space 5, in which it is held by internal projections 6. In the lower part of the space 5 a quantity of arsenic 7 is situated the mass of which is larger than that of the charge of gallium 1. The space and the crucible consist of pure quartz.

After degassing and evacuating, the space 5 is sealed and placed in a heater which heats the region 9 of the space and the quantity of arsenic 7 at a temperature of 610° C. and the region 10 of the space and the crucible 2 containing the quantity of gallium and boron oxide, which has a smaller density than the gallium or the gallium arsenide, at a temperature of at least 1,250° C. higher than the melting temperature of the gallium arsenide.

The vapor pressure of the arsenic is saturated and increases to approximately 1 atm., the arsenic penetrates into the crucible 2 through the porous wall 3 and diffuses into the gallium by the action of a small vertical concentration gradient in the liquid phase.

The system is kept in the above-mentioned conditions until saturation of the liquid phase by the arsenic, the quantity of which is sufficient to maintain a pressure of 1 atm. During this formation treatment, the surface of the liquid phase is insulated from the gaseous phase and the boron oxide at the same time serves as a protection and purification medium.

The liquid phase is then cooled by producing a vertical temperature gradient at the area of the region 10, which gradient is then slowly displaced to traverse entirely the gallium arsenide mass situated in the crucible 2.

The vertical temperature gradient is, for example, of the order of magnitude of 20° per cm. and is moved downwards at a rate of 1 cm. per hour.

During crystallization, the liquid and solid phases, as well as the interface solid-liquid of the gallium-arsenide, are insulated from the arsenic vapor and the perturbation possibly causes by the porous wall 3 can influence only the layer of the crystal situated there.

In the case of a horizontal device as shown in FIG. 2, a quantity of gallium 11 is placed in an elongate boat 12. A quantity of boron oxide which is sufficient to form a thick layer 13 in the liquid state is placed on the gallium. At one end of the boat 12, a porous element 14 is placed in such manner as to cover a small surface area of the gallium mass in the liquid state, the remaining part of the surface of said liquid phase being covered by the boron oxide 13.

The boat is placed in a first region 16 of a horizontal airtight space 15. In a second region 17 at the other end of the said space 15, a quantity of arsenic 18 is placed which exceeds the quantity of gallium. The space 15 and the boat 12 preferably consist of pure quartz.

After degassing and evacuating, the space 15 is sealed and placed in a heater 19 which heats the region 17 and the quantity of arsenic 18 at a temperature of 610° c., and the region 16 and the boat 17 with the quantity of gallium 11 and the boron oxide 13 at a temperature of at least 1,250° C., a small positive temperature gradient towards the porous element 14 being displaced along the boat.

The vapor pressure of the arsenic is saturated and is approximately equal to 1 atm., the arsenic penetrates into the gallium through the porous element 14 and the remaining part of the gallium surface is protected and purified by the boron oxide. The arsenic slowly diffuses into the gallium.

The system is kept in the above-mentioned conditions until saturation of the liquid phase by the arsenic the quantity of which is sufficient to maintain a pressure of 1 atm. until said saturation. During the whole process of the formation of the gallium arsenide, the surface of the liquid remains insulated from the gaseous phase and the boron oxide retains any impurities.

The liquid phase is then cooled by causing a horizontal temperature gradient to traverse the whole length of the boat. The gradient is, for example, 15° per cm. and is displaced in the direction of the arrow 20 at a rate of 1 cm. per hour.

During this crystallization the liquid and solid phases and the interface solid-liquid which is displaced with the said gradient remain insulated from the arsenic vapor. Crystallization is carried out in a manner similar to that used in the Bridgman method, but the method according to the invention has the advantage that the crystal is protected from the vapor phase which up till now was possible only in the method according to Czochralski with liquid encapsulation.

The perturbation possibly caused by the porous element 14 can influence only the part of the crystal which is situated there.

It is to be noted that the volatile component, for example, arsenic in the example described, can be used in a form different from a quantity of pure product which is gradually evaporated in a closed space. The supply may be effected in the form of a current of gas; the component is then transported, for example, by a neutral gas or is applied in the form of a gaseous compound.

According to another embodiment of the method according to the invention, in which, for example, a horizontal device is used, the crystallization by gradual cooling from one end of the boat to the other is started immediately after the formation of a first layer of a stoichiometric compound and the temperature gradient is displaced along the boat at the rate of formation of the compound. It is possible, for example, to use the method according to the invention in combination with the method of formation described in patent application PV 113 370 filed by applicants on 6.7.67 for a "method of forming binary compounds", and also the deposition method described in the addition PV 134412 filed by application on 29.17.67 for "method for the epitaxial deposition in the liquid phase."

This embodiment has the additional advantage of requiring no temperatures which are much lower than the melting temperatures of the compounds.

Of course, many variations are possible to those skilled in the art without departing therefor from the scope of this invention.

What is claimed is:

1. A method of manufacturing a crystal of a semiconductor AIII BV compound by diffusion of a volatile component in a liquid component in which crystallization occurs gradually by displacing a temperature gradient, in which the liquid component is placed in a vertical crucible in which the volatile component is diffused through a porous bottom part, boron oxide covering the whole surface of the liquid phase heating the volatile component to a temperature at which a pressure is maintained which is sufficient for said component to be diffused through the porous bottom part, heating the liquid component to a temperature which is higher than the melting temperature of the semiconductor compound, and displacing a vertical temperature gradient vertically with respect to the crucible so as to obtain a gradual crystallization of the semiconductor compound.

2. A method of manufacturing a crystal of a semiconductor AIII BV compound by diffusion of a volatile component in a liquid component in which crystallization occurs gradually by displacing a temperature gradient, in which the liquid component is placed in a horizontal boat and boron oxide covers the whole surface of the liquid with the exception of a part of said surface which is covered by a porous plate through which the volatile component diffuses into the liquid component, the volatile component being heated to a temperature at which said component is maintained at a pressure sufficient for it to diffuse through the plate, and maintaining the boat at a temperature which is higher than the melting temperature of the component therein and displacing a horizontal temperature gradient in the longitudinal direction of the boat so as to obtain the gradual crystallization of the semiconductor compound.

* * * * *